United States Patent
Hamann et al.

(10) Patent No.: US 10,823,305 B2
(45) Date of Patent: Nov. 3, 2020

(54) LAMINATED SOLENOID ARMATURE FOR AN ELECTROMAGNETIC ACTIVATION DEVICE AND INJECTION VALVE FOR METERING A FLUID

(71) Applicant: Continental Automotive GmbH, Hannover (DE)

(72) Inventors: Christoph Hamann, Thalmassing (DE); Dejan Jovovic, Regensburg (DE)

(73) Assignee: VITESCO TECHNOLOGIES GMBH, Hannover (DE)

( * ) Notice: Subject to any disclaimer, the term of this patent is extended or adjusted under 35 U.S.C. 154(b) by 327 days.

(21) Appl. No.: 15/762,647

(22) PCT Filed: Sep. 23, 2016

(86) PCT No.: PCT/EP2016/072691
§ 371 (c)(1),
(2) Date: Mar. 23, 2018

(87) PCT Pub. No.: WO2017/050967
PCT Pub. Date: Mar. 30, 2017

(65) Prior Publication Data
US 2018/0299026 A1    Oct. 18, 2018

(30) Foreign Application Priority Data

Sep. 24, 2015    (DE) .......................... 10 2015 218 421

(51) Int. Cl.
*H01H 3/00* (2006.01)
*F16K 31/06* (2006.01)
(Continued)

(52) U.S. Cl.
CPC ..... *F16K 31/0675* (2013.01); *F02M 51/0625* (2013.01); *F02M 63/0021* (2013.01);
(Continued)

(58) Field of Classification Search
CPC . F16K 31/0675; F16K 31/0651; F02M 61/20; F02M 63/0022; F02M 63/0071;
(Continued)

(56) References Cited

U.S. PATENT DOCUMENTS

| 3,036,247 A | 5/1962 | Brent | 335/281 |
| 3,205,826 A | 9/1965 | Stefani | 417/412 |

(Continued)

FOREIGN PATENT DOCUMENTS

| DE | 102015209946 A1 | 12/1916 | ............... H01F 3/02 |
| DE | 502063 C | 7/1930 | ........... H01F 27/245 |

(Continued)

OTHER PUBLICATIONS

European Office Action, Application No. 16770751.2, 5 pages, dated Feb. 6, 2020.

(Continued)

*Primary Examiner* — Shawki S Ismail
*Assistant Examiner* — Lisa N Homza
(74) *Attorney, Agent, or Firm* — Slayden Grubert Beard PLLC

(57) ABSTRACT

The present disclosure relates to actuators. Various embodiments may include a laminated magnet armature for an electromagnetic actuating device, an injection valve for metering a fluid, and/or an electromagnetic actuating device having a laminated magnet armature. For example, a laminated magnet armature for an electromagnetic actuating device wherein the magnet armature is displaceable along an axis A in a movement direction may include a multiplicity of interconnected laminations oriented perpendicular to the axis A and stacked to form a lamination stack with a bottom side and a top side. Each lamination includes at least one recess open toward an edge of the lamination. The laminations are arranged within the lamination stack so the recesses (Continued)

form at least one duct extending through the lamination stack from the bottom side to the top side.

10 Claims, 2 Drawing Sheets

(51) Int. Cl.
*F02M 63/00* (2006.01)
*F02M 51/06* (2006.01)
*H01F 7/08* (2006.01)
*H01F 7/16* (2006.01)
*F02M 61/10* (2006.01)

(52) U.S. Cl.
CPC ...... *F16K 31/0651* (2013.01); *F16K 31/0665* (2013.01); *H01F 7/081* (2013.01); *H01F 7/16* (2013.01); *H01F 7/1607* (2013.01); *F02M 61/10* (2013.01); *F02M 2200/08* (2013.01); *H01F 2007/086* (2013.01)

(58) Field of Classification Search
CPC .......... F02M 63/0021; F02M 51/0625; F02M 51/0665; H01F 7/081; H01F 7/16
USPC ........................................................ 335/279
See application file for complete search history.

(56) References Cited

U.S. PATENT DOCUMENTS

| | | | | |
|---|---|---|---|---|
| 3,525,062 | A | 8/1970 | Haug et al. | 335/249 |
| 3,538,601 | A | 11/1970 | Nerot et al. | 29/609 |
| 3,952,272 | A * | 4/1976 | Howell, Jr. | H01F 7/08 335/264 |
| 4,984,549 | A | 1/1991 | Mesenich | 123/472 |
| 5,280,873 | A | 1/1994 | Abrahamsen et al. | 251/129.15 |
| 5,903,204 | A | 5/1999 | Schmitz et al. | 335/227 |
| 6,155,503 | A * | 12/2000 | Benson | F02M 51/06 239/585.1 |
| 7,225,770 | B2 * | 6/2007 | Simpson | F01L 9/04 123/90.11 |
| 7,533,834 | B2 * | 5/2009 | Grundl | F02M 45/08 239/585.1 |
| 7,551,297 | B2 | 6/2009 | Koakutsu | 358/1.1 |
| 9,045,480 | B2 | 6/2015 | Schöning et al. | |
| 2008/0048361 | A1 * | 2/2008 | Neubauer | B29C 45/0046 264/272.19 |
| 2008/0092854 | A1 | 4/2008 | Grundl et al. | 123/476 |
| 2009/0115262 | A1 | 5/2009 | Spiers | 310/28 |

FOREIGN PATENT DOCUMENTS

| | | | |
|---|---|---|---|
| DE | 1287693 U | 3/1937 | |
| DE | 1764271 C3 | 11/1982 | H01F 7/08 |
| DE | 3408012 A1 | 9/1985 | F02D 41/20 |
| DE | 4201448 A1 | 7/1993 | F16K 31/06 |
| DE | 19537362 A1 | 4/1996 | H01F 41/02 |
| DE | 29706491 U1 | 8/1998 | F01L 9/04 |
| DE | 102004032229 B3 | 1/2006 | F02M 45/08 |
| DE | 102010030393 A1 | 12/2011 | F02M 51/00 |
| DE | 102012214628 A1 | 2/2014 | H01F 7/16 |
| EP | 0131352 A1 | 1/1985 | H01F 3/10 |
| EP | 0383064 A1 | 8/1990 | F02M 51/06 |
| EP | 0795881 A1 | 9/1997 | H01F 7/08 |
| EP | 1078156 B1 | 8/2002 | F02M 51/06 |
| EP | 1070198 B1 | 5/2005 | F01L 9/04 |
| EP | 1618298 B1 | 7/2008 | F02M 45/08 |
| FR | 1528470 A | 6/1968 | H01F 7/08 |
| FR | 1548002 A | 11/1968 | H01F 7/08 |
| GB | 303065 A | 5/1930 | F25B 1/06 |
| GB | 568216 A | 3/1945 | F01L 9/04 |
| JP | 6176921 B2 | 8/1917 | C07D 211/94 |
| JP | 0298905 A | 4/1990 | F02M 51/00 |
| JP | 0828736 A | 2/1996 | F16K 31/06 |
| JP | 0945524 A | 2/1997 | H01F 7/06 |
| JP | 2000195719 A | 7/2000 | F01L 9/04 |
| JP | 2002343626 A | 11/2002 | F02M 51/06 |
| JP | 4365305 B2 | 11/2009 | G06F 3/06 |
| WO | 2017/050967 A1 | 3/1917 | F02M 51/06 |
| WO | 00/46490 A1 | 8/2000 | F01L 9/04 |
| WO | 2015126304 A1 | 8/2015 | F16K 31/06 |

OTHER PUBLICATIONS

German Office Action, Application No. 1020152185421.8, 6 pages, dated Aug. 9, 2016.
International Search Report and Written Opinion, Application No. PCT/EP2016/072691, 21 pages, dated Jan. 30, 2017.
Korean Office Action, Application No. 2019035771997, 12 pages, dated May 20, 2019.

* cited by examiner

LAMINATED SOLENOID ARMATURE FOR
AN ELECTROMAGNETIC ACTIVATION
DEVICE AND INJECTION VALVE FOR
METERING A FLUID

CROSS-REFERENCE TO RELATED
APPLICATIONS

This application is a U.S. National Stage Application of International Application No. PCT/EP2016/072691 filed Sep. 23, 2016, which designates the United States of America, and claims priority to DE Application No. 10 2015 218 421.8 filed Sep. 24, 2015, the contents of which are hereby incorporated by reference in their entirety.

TECHNICAL FIELD

The present disclosure relates to actuators. Various embodiments may include a laminated magnet armature for an electromagnetic actuating device, an injection valve for metering a fluid, and/or an electromagnetic actuating device having a laminated magnet armature.

BACKGROUND

Injection valves serve for the controlled metering of a fluid, for example the injection of fuel into the intake tract or into the combustion chamber of an internal combustion engine. The injection valve may be controlled by means of an electromagnetic actuating device with an electrically energizable coil and a magnet armature manufactured from a ferromagnetic material. When a voltage is applied to the coil, a magnetic field builds up in the interior of the coil, by means of the action of which the ferromagnetic magnet armature can be moved. Coupled to the magnet armature is a valve needle which, by means of the magnetic interaction between the coil magnetic field and magnet armature, moves into a position in which it opens up the outlet of the injection valve or a position in which it closes said outlet, such that a fluid to be metered, for example fuel, can be discharged in a controlled manner.

EP 1 070 198 B1 describes an electromagnetic actuator with a laminated armature constructed as a laminated core composed of a multiplicity of fixedly interconnected lamination plates, wherein the lamination plates are arranged between two covering laminations and are oriented perpendicular thereto. A disadvantage here consists in the cumbersome production of such an arrangement.

SUMMARY

The teachings of the present disclosure may be embodied in a laminated magnet armature which can be produced inexpensively and easily and which at the same time exhibits good magnetic and/or hydraulic characteristics. Some embodiments provide an inexpensive injection valve having an electromagnetic actuating device with a laminated magnet armature.

For example, some embodiments include a laminated magnet armature (10) for an electromagnetic actuating device, wherein the magnet armature (10) is displaceable along an axis A in a movement direction, comprising a multiplicity of interconnected laminations (14). The laminations (14) are oriented perpendicular to the axis A and are stacked in a movement direction of the magnet armature (10) to form a lamination stack with a bottom side and a top side, and in that each lamination (14) has at least one recess (16) which is open toward an edge (17) of the lamination (14), wherein the laminations (14) are arranged within the lamination stack such that, by means of the recesses (16), at least one duct (18) is formed which extends through the lamination stack from the bottom side to the top side.

In some embodiments, the at least one recess (16) is of slot-like form.

In some embodiments, the at least one recess (16) is of circular form or, proceeding from the edge (17) of the lamination (14), initially extends radially inward in slot-like form and then widens in circular form.

In some embodiments, between 5, inclusive, and 15, inclusive, laminations (14) are stacked to form the lamination stack. In some embodiments, the lamination stack has, on the top side and/or on the bottom side, a sheet-metal disk which is manufactured from a material with a greater hardness than the material of the laminations (14).

In some embodiments, the laminations (14) are connected to one another in cohesive and/or force-fitting and/or form-fitting fashion to form the lamination stack.

In some embodiments, each lamination (14) has between 2, inclusive, and 10, inclusive, recesses (16) which are open toward the edge (17) of the lamination (14).

In some embodiments, the laminations (14) are obtained from a sheet-metal plate by punching.

In some embodiments, the laminations (14) are arranged offset with respect to one another within the lamination stack such that at least one continuous, spiral-shaped duct (18) is formed by the recesses (16).

As another example, some embodiments may include an injection valve (1) for metering a fluid, comprising an electromagnetic actuating device having a laminated magnet armature (10) as described above.

BRIEF DESCRIPTION OF THE DRAWINGS

The present disclosure will be discussed in more detail below on the basis of exemplary embodiments and with reference to the appended drawings. In the drawings.

DETAILED DESCRIPTION

Figure 1:
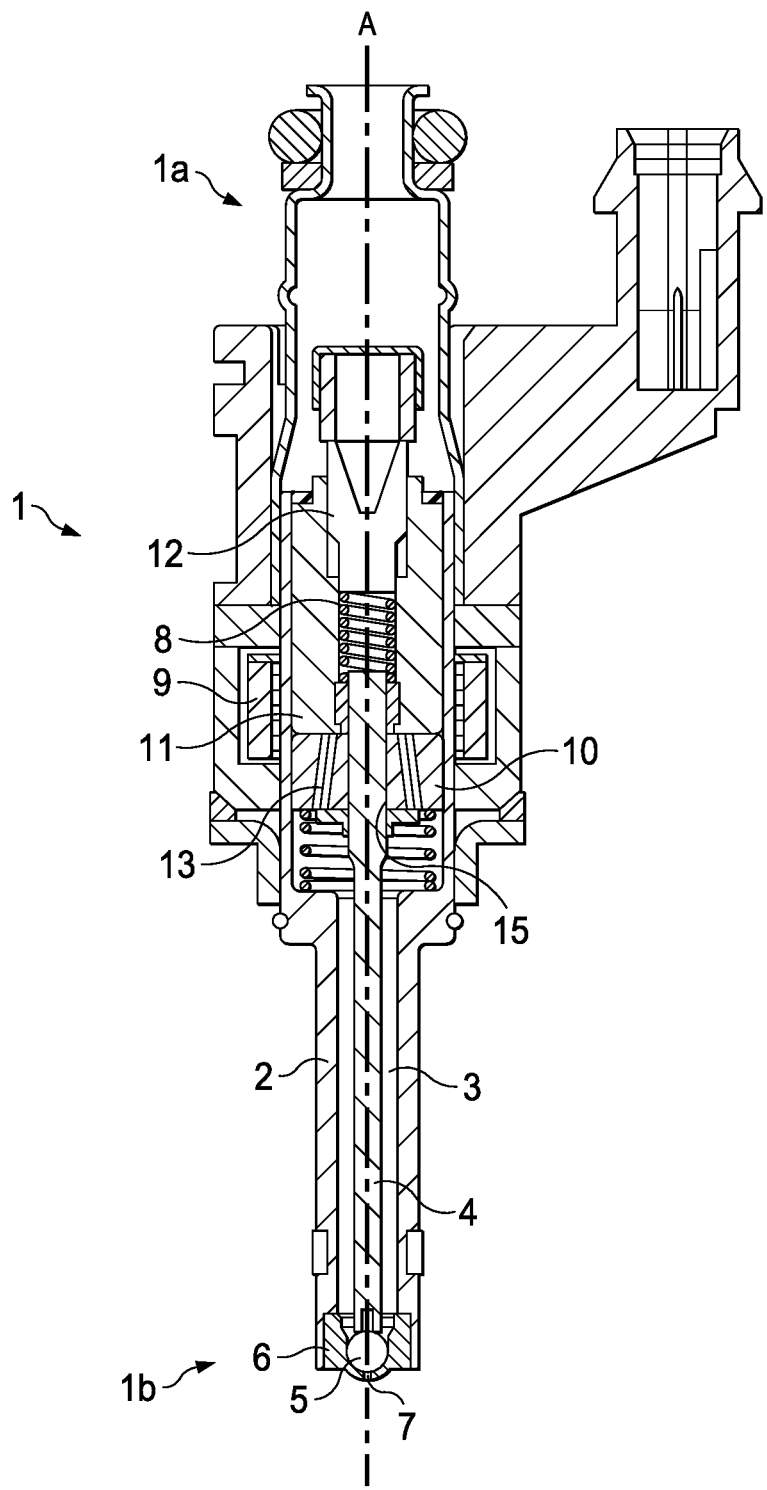
FIG. 1 schematically shows a sectional illustration of an injection valve according to the prior art.

In some embodiments, a laminated magnet armature for an electromagnetic actuating device is displaceable along an axis A in a movement direction, comprising a multiplicity of interconnected laminations, wherein the laminations are oriented perpendicular to the axis A and are stacked in a movement direction of the magnet armature to form a lamination stack with a bottom side and a top side. Here, each lamination has at least one recess which is open toward an edge of the lamination, wherein the laminations are arranged within the lamination stack such that, by means of the recesses, at least one duct is formed which extends through the lamination stack from the bottom side to the top side.

In other words, the magnet armature may be produced from a multiplicity of laminations, which are stacked one on top of the other in a movement direction of the magnet armature. The planes—that is to say in particular the main planes of extent—of the individual laminations thus lie perpendicular to the movement direction of the magnet armature, or the surface normals of the individual laminations lie parallel to the movement direction of the magnet armature. The laminations may comprise flat disks, sometimes also referred to as plane-parallel plates.

In the present context, the fact that the laminations are "layered to form a lamination stack" means that the lamination stack comprises the laminations. In other words, the laminations are laid one on top of the other to form the lamination stack; they follow one another in the direction of the axis such that in each case two successive laminations adjoin one another, specifically with their main surfaces facing one another. The main surfaces are those surfaces of a respective lamination which face one another and which are parallel to the main plane of extent. In other words, the main surfaces of a lamination are those sections of its surface which delimit the lamination in an axial direction toward the top side and toward the bottom side, respectively, of the lamination stack.

Each lamination includes at least one recess which is open toward an edge of the lamination and which serves for the suppression, or at least for the reduction, of eddy currents in the laminations. Here, the individual laminations are arranged one behind the other such that at least one duct which extends through the lamination stack from the bottom side to the top side is formed by the recesses. This is of importance because, in the case of the magnet armature according to the invention being used in an injection valve, a passage for the fluid for metering must be provided. For example, the individual laminations may be arranged such that their recesses all and fully overlap. In this way, a number of ducts determined by the number of recesses per lamination is formed within the lamination stack, through which ducts the fluid for metering can flow. By means of the duct or the ducts, a particularly large hydraulic diameter can be realized in the region of the magnet armature.

The "edge of a lamination" is to be understood to mean a circumferential surface encircling the lamination. The circumferential surface delimits the lamination in a radial direction away from the axis A. The fact that the recess of a lamination "is open toward an edge of the lamination" means that the circumferential surface encircling the lamination has openings from which the respective recess extends radially inward into the lamination.

In some embodiments, the recesses in the laminations are of slot-like form. Here, the slots may for example be arranged to run radially from the edge of the lamination toward the center.

In some embodiments, the recesses in the laminations may be of approximately circular form proceeding from the edge of the laminations, whereby a particularly good passage for the fluid for metering is made possible. A combination of circular recess and slot is also conceivable, wherein, for example, a slot running inward from the edge of the lamination widens to form a circular recess. Any other desired designs of the recesses are viable, as long as the required passage for the fluid and at the same time adequate stability of the individual laminations are realized.

In some embodiments, the number of laminations used for the magnet armature lies between 5 and 15.

In some embodiments, the lamination stack has, on the top side and/or on the bottom side, a sheet-metal disk which is manufactured from a material with a greater hardness than the material of the laminations. The laminations arranged outermost within the lamination stack abut against surrounding components during the movement of the magnet armature—for example for the purposes of stopping the movement of the magnet armature—and are therefore subject to particularly high wear. Through the additional use of sheet-metal disks of relatively high hardness on the top side and/or on the bottom side, the wearing tendency of the magnet armature can be favorably influenced, and the otherwise customary chromium plating process can be omitted. As a material for the relatively hard sheet-metal disks, use may for example be made of hard-rolled high-grade steel of type SS302.

In some embodiments, the individual laminations are connected by cohesion, for example by welding, e.g., laser welding, brazing, or similar connecting techniques. For this purpose, the individual laminations are stacked one on top of the other in the desired arrangement, and multiple weld seams are applied to the outer wall of the magnet armature thus constructed, in a manner distributed over the circumference thereof. A cohesive connection of the individual laminations may basically also be realized by adhesive bonding. In some embodiments, the connection of the individual laminations may be realized by force fit and/or form fit.

In some embodiments, each lamination has 2 to 10 recesses which are open toward the edge of the lamination. With regard to the number of recesses and the size thereof, on the one hand, the throughflow for the fluid for metering must be realized, but on the other hand, an adequate lamination area must remain in order to ensure both the stability of the individual laminations and the adequate magnetic interaction between the magnetic field of the coil and the magnet armature. The number of recesses may therefore also be dependent on the size thereof.

In some embodiments, not all laminations within the lamination stack have the same number and/or shaping of recesses which are open toward the edge. In some embodiments, at least one duct which extends through the lamination stack from the bottom side to the top side is formed, for the throughflow of fluid, by the recesses provided. The recesses of a lamination may be arranged to be distributed uniformly or non-uniformly over the area of the lamination.

In some embodiments, the individual laminations themselves, which have been stacked to form the magnet armature, need not all have the same shape. In some embodiments, laminations of relatively small area may be provided within the lamination stack, whereby the overall weight of the magnet armature may be reduced. A reduction in size of the area may be realized by means of a central recess within the lamination, such that be lamination has a rather circular-ring-shaped form. In some embodiments, sufficient material remains in order to both ensure the stability of the lamination and ensure the magnetic coupling.

In some embodiments, a central recess could also widen further within the lamination stack, that is to say the diameter of the central recess could increase or decrease from one lamination to the next in the stack direction. Finally, a weight reduction of the magnet armature may also be achieved by virtue of the individual laminations being composed of multiple circular rings of different diameter which are connected to one another by means of spoke-like connecting webs, wherein the recesses which are open toward the edge may basically be arranged in any of the circular rings.

In some embodiments, the individual laminations are produced by being punched out of corresponding sheet-metal plates.

In some embodiments, the laminations may be arranged offset with respect to one another within the lamination stack such that at least one spiral-shaped duct which extends in continuous fashion from the bottom side to the top side is formed by the recesses. A spiral-shaped or spiral-like duct is one whose profile follows a helical line, or at least a part of a helical line. In other words, the recesses of the individual laminations are not placed into an exactly overlapping state, it rather being the case that successive laminations within the stack are arranged so as to be rotationally offset with respect to one another by an angle α, such that their recesses in each case only partially overlap, and the duct formed in this way by the entirety of the recesses has a spiral-like profile.

In some embodiments, an injection valve for metering a fluid, comprising an electromagnetic actuating device having the described laminated magnet armature, is specified.

FIG. 1 shows an injection valve 1 known from the prior art, such as is used for example for injecting fuel into the intake tract or into the combustion chamber of an internal combustion engine. The injection valve 1 has a fluid inlet end 1a and a fluid outlet end 1b and comprises a valve housing 2 which surrounds a cavity 3. A valve needle 4 is arranged within the cavity 3. The valve needle 4 is displaceable relative to the valve housing 2 along an axis A. The valve needle 4 has, on its end facing toward the fluid outlet end 1b of the injection valve 1, a closing element 5 in the form of a ball, with which the valve needle 4 can be received in a valve seat 6. The valve seat 6 has an opening 7, which can be opened up or closed off by the closing element 5 of the valve needle 4. If the valve needle 4 is moved into a position in which it opens up the opening 7, a fluid for metering can emerge from the injection valve 1 through the opening 7. If the valve needle 4 is situated in a position in which it closes off the opening 7, no fluid can emerge from the injection valve 1.

By means of a valve spring 8, the valve needle 4 can be preloaded into a position in which it closes off the opening 7, such that the valve needle 4 is pushed with its closing element 5 formed as a ball into the valve seat 6 and closes off the opening 7. For the adjustment of a required spring stress of the valve spring 8, a calibration unit 12 is provided.

For moving the valve needle 4 into a position in which it opens up the opening 7, the injection valve 1 has an electromagnetic actuating device, which comprises a magnet coil 9 and a magnet armature 10. The magnet coil 9 concentrically surrounds a section of the valve housing 2. As a result of electrical energization of the magnet coil 9, a magnetic field builds up in the interior of the magnet coil 9, the orientation of which magnetic field can be additionally influenced by means of a pole shoe 11.

The magnet armature 10, which is composed of a ferromagnetic material, is arranged within the valve housing 2 in the cavity 3 and is mechanically coupled to the valve needle 4. Said magnet armature is, like said valve needle or together with said valve needle, displaceable relative to the valve housing 2 along the axis A, in a movement direction predefined by said axis. When the magnet coil 9 is electrically energized, the magnet armature 10—and the valve needle 4 mechanically coupled thereto—moves in the direction of the fluid inlet end 1a of the injection valve 1, counter to the stress force of the valve spring 8, owing to magnetic interaction with the magnetic field built up in the coil, and the opening 7 in the valve seat 6 is thus opened up for the throughflow of fluid.

For the closure of the injection valve 1, the electrical energization of the magnet coil 9 is ended, and the valve needle 4 is pushed into the valve seat 6 again by the spring force of the valve spring 8.

In FIG. 1, two ducts 13 extending through the magnet armature 10 are illustrated. Said ducts serve for the throughflow of the fluid, in this case fuel, from the region of the fluid inlet end 1a through the magnet armature 10 into the region of the fluid outlet end 1b. Magnet armatures known from the prior art, such as the magnet armature 10 in FIG. 1, are formed for example by sintering technology, or as solid components which are turned from a bar and drilled.

Figure 2:
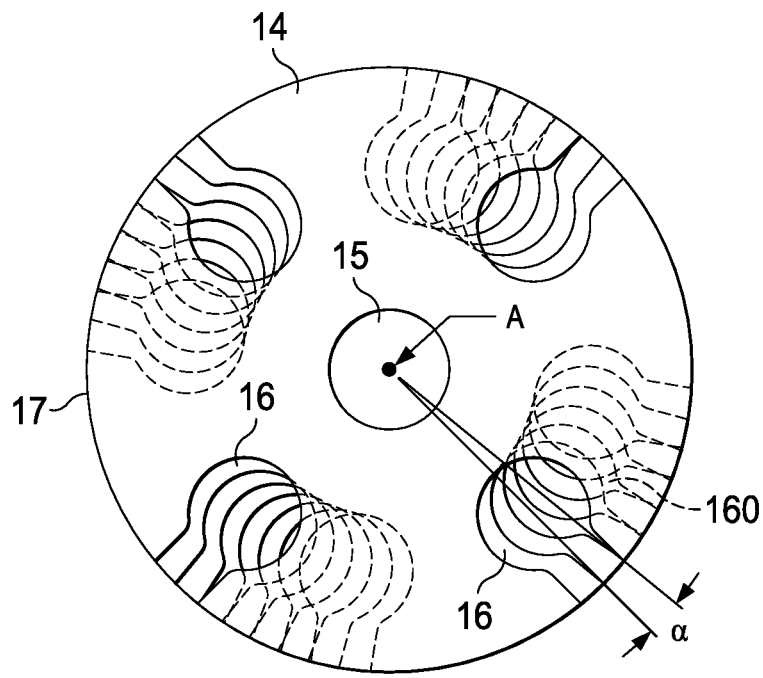
FIG. 2 shows a plan view of a lamination of a magnet armature according to an embodiment of the present teachings.
Figure 3:
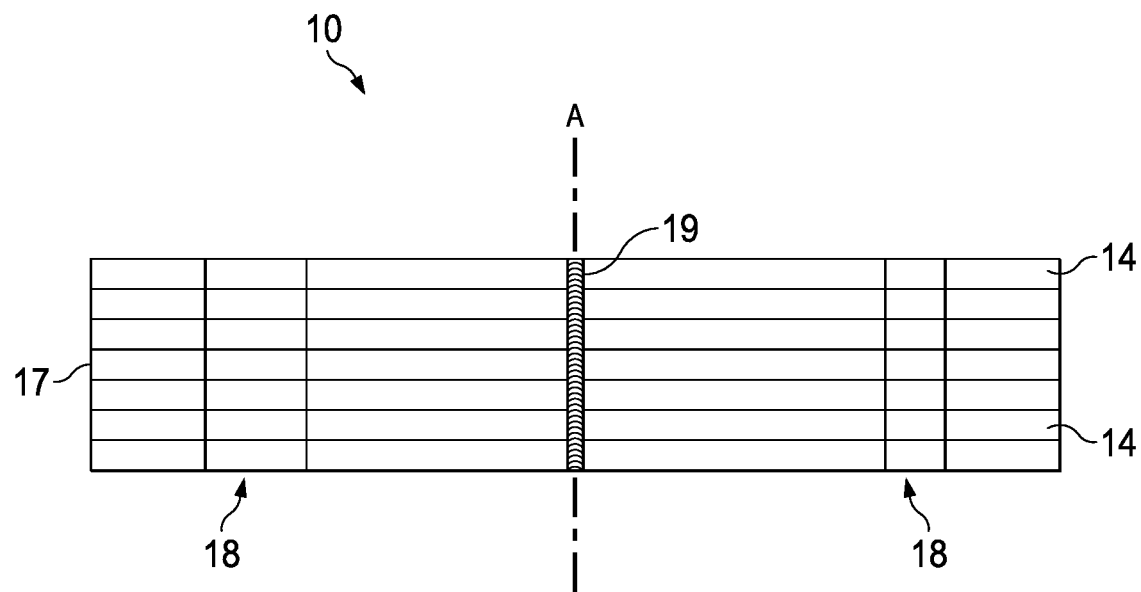
FIG. 3 shows a schematic side view of a laminated magnet armature of a magnetic core according to an embodiment of the present teachings.

In some embodiments of the present teaching, in contrast, the magnet armature 10 may be constructed as a laminated magnet armature composed of individual laminations 14, of which FIG. 2 illustrates one lamination 14 according to the present teachings. The circular lamination 14 may be obtained by punching from a corresponding sheet-metal plate. As can be seen from the side view of the exemplary embodiment of a laminated magnet armature 10 shown in FIG. 3, seven laminations 14 are stacked one on top of the other to form said magnet armature. The laminations 14 follow one another along the axis A in form-fitting fashion, such that the main surfaces, facing toward one another, of successive laminations 14 adjoin one another.

Furthermore, in some embodiments, the laminations 14 are connected to one another by means of a laser welding process, wherein, for this purpose, multiple weld seams 19 are applied to the outer wall of the magnet armature 10, in a manner distributed over the circumference thereof. After the laser welding process has been performed, the laminations 14 may be cohesively connected by means of the weld seams 19 in the finished armature. The weld seams 19 run in an axial direction across multiple laminations 14; in the present case, they run parallel to the axis A and connect all of the laminations 14 to one another.

In some embodiments, the individual laminations 14 have in each case one central, circular recess 15 through which the valve needle 4 can be led. The recess 15 is positioned identically in all of the laminations 14, such that, when the individual laminations 14 are stacked one on top of the other to form the magnet armature 10, a central receiving duct for the valve needle 4 is formed. The valve needle 4 is connected in the region of said recesses 15 to the laminations 14, whereby the abovementioned mechanical coupling between the valve needle 4 and magnet armature 10 is realized.

In some embodiments, the individual laminations 14 are stacked one on top of the other in a movement direction of the magnet armature 10, that is to say the laminations 14 are oriented substantially perpendicular to the main axis A. The surface normals of the main surfaces of the laminations 14 are parallel to the axis A.

In addition to the central recess 15, the lamination 14 illustrated in FIG. 2 has four further recesses 16, which are arranged to be distributed uniformly over the circumference of the lamination 14 and which are open toward the edge 17 of the lamination 14. That is to say, the recesses 16 open in the radially outward direction into the circumferential surface, which forms the edge 17, of the respective lamination.

Proceeding from the edge 17 of the lamination 14, the recesses 16 are initially of slot-like form and then widen in circular fashion in the direction of the recess 15. The recesses 16 serve firstly for the throughflow of fuel within the injection valve 1, but they secondly also have the function of suppressing or at least reducing eddy currents that are induced in the laminations 14 of the magnet armature 10 by the build-up and depletion of the magnetic field in the magnet coil 9.

The stacking of individual laminations 14 to form the laminated magnet armature 10 may be realized in a variety of ways. Accordingly, identical laminations 14 may be stacked one above the other such that their recesses 16 all overlap. In this way, within the lamination stack, the recesses 16 form four ducts 18, which run through the magnet armature 10 parallel to the central duct realized by the recesses 15. Such stacking is shown by the side view in FIG. 3. The stacking of the laminations 14 may however also be realized such that two successive laminations 14 are arranged to be in each case slightly offset with respect to one another with regard to their recesses 16. Here, an offset arrangement is to be understood to mean that one lamination 14 within the stack is arranged to be rotated relative to the preceding lamination 14 by an angle of rotation a. An exemplary angle of rotation a is depicted in FIG. 2. Furthermore, by way of example for one recess 16, the position of the corresponding recess 160, displaced by a rotation through the angle α, in the adjacent lamination 14 is illustrated by dashed lines.

The ducts 18 that result from the individual, rotationally mutually offset recesses 16, 160 then extend through the magnet armature 10 in a rather spiral-shaped fashion. It must be taken into consideration here that an angle of rotation a is selected such that the recesses 16 of successive laminations 14 have at least an overlap which is large enough for the throughflow of fuel.

What is claimed is:

1. A laminated magnet armature for an electromagnetic actuating device wherein the magnet armature is displaceable along an axis A in a movement direction, the armature comprising:
   a multiplicity of interconnected laminations;
   wherein the laminations are oriented perpendicular to the axis A and are stacked in a movement direction of the magnet armature to form a lamination stack with a bottom side and a top side; and
   each lamination includes at least one recess open toward an edge of the lamination;
   the at least one recess initially extends radially inward in slot-like form and then widens into circular form; and
   the laminations are arranged within the lamination stack so the recesses form at least one duct extending through the lamination stack from the bottom side to the top side.

2. The laminated magnet armature as claimed in claim 1, wherein the at least one recess comprises a slot.

3. The laminated magnet armature as claimed in claim 1, wherein the at least one recess comprises a circle.

4. The laminated magnet armature as claimed in claim 1, wherein the lamination stack consists of between 5, inclusive, and 15, inclusive, laminations.

5. The laminated magnet armature as claimed in claim 1, wherein the lamination stack comprises at least one sheet-metal disk disposed on the top side or on the bottom side comprising a material with a greater hardness than the material of the laminations.

6. The laminated magnet armature as claimed in claim 1, wherein the laminations are connected to one another in cohesive and/or force-fitting and/or form-fitting fashion to form the lamination stack.

7. The laminated magnet armature as claimed in claim 1, wherein each lamination includes between 2, inclusive, and 10, inclusive, recesses open toward the edge of the lamination.

8. The laminated magnet armature as claimed in claim 1, wherein the laminations comprise a punch obtained from a sheet-metal plate.

9. The laminated magnet armature as claimed in claim 1, wherein the laminations are arranged offset with respect to one another within the lamination stack forming at least one continuous, spiral-shaped duct with the recesses.

10. An injection valve for metering a fluid, the injection valve comprising:
    an electromagnetic actuating device; and
    an armature comprising:
    armature comprising:
    a multiplicity of interconnected laminations;
    wherein the laminations are oriented perpendicular to the axis A and are stacked in a movement direction of the magnet armature to form a lamination stack with a bottom side and a top side; and
    each lamination includes at least one recess open toward an edge of the lamination;
    the at least one recess initially extends radially inward in slot-like form and then widens into circular form; and
    the laminations are arranged within the lamination stack so the recesses form at least one duct extending through the lamination stack from the bottom side to the top side.

\* \* \* \* \*